3,257,983
ROLL-REDUCING AND STABILIZING APPARATUS FOR SHIPS
James Henderson, Edinburgh, Scotland, assignor to Brown Brothers & Co. Limited, Edinburgh, Scotland, a corporation of Great Britain
No Drawing. Filed Oct. 22, 1964, Ser. No. 411,664
Claims priority, application Great Britain, Oct. 26, 1963, 42,312/63
10 Claims. (Cl. 114—125)

This invention relates to roll-reducing and stabilizing apparatus for ships and particularly to apparatus of the type in which two tanks located at opposite sides of the hull of the ship are connected by a flume and operating fluid contained in the tanks flows from one tank to the other to effect a reduction in the rolling motion of the ship or a stabilizing action.

In such apparatus as heretofore constructed and used the operating fluid has customarily been fresh water or salt water. Where space is restricted the fluid may be part of the cargo, the ballast or the fuel.

Heretofore the operating fluids employed have been true liquids.

The higher the specific gravity of the operating fluid employed the smaller may be the capacity of the tanks to provide the same roll-reducing or stabilizing effect. With the exception of mercury which is prohibitively expensive for the purpose, the only true liquids readily available and not disqualified by reason of dangerous attributes such as corrosiveness have specific gravities only slightly exceeding unity.

Roll-reducing or stabilizing apparatus of the type referred to according to the invention incorporates an operating fluid consisting of a suspension of a heavy solid in a liquid.

The particles of the heavy solid may be sufficiently small to cause the solid and the liquid to form a colloid.

The particles of the heavy solid may be larger than is necessary to form a colloid and in that case the fluid may contain an auxiliary solid, for example, bentonite, which readily forms a colloid with the liquid, the colloid formed by the particles of the auxiliary solid and the liquid preventing the particles of the heavy solid from precipitating.

An auxiliary solid forming a colloid with the liquid may also be used where the heavy solid will not itself form a colloid with the liquid.

The operating fluid may also contain a quantity of a buffer solution to prevent the colloid from being easily broken. The appropriate buffer solution required to suit the constituents of the fluid can be readily predicted from present day knowledge of the chemical art.

Where the heavy solid and/or the auxiliary solid are such that the viscosity of the operating fluid would normally be inconveniently high the fluid may contain a viscosity-reducing substance. Such substances are well known in the chemical industry.

As an example an operating fluid may consist of a suspension of barium sulphate in water. Barium sulphate has a specific gravity of around 4 and it is possible by using particles of barium sulphate of a small enough size to make a dispersion which will remain for several hours without precipitation taking place and will yet contain enough barium sulphate to produce an operating fluid having a specific gravity lying between 2 and 3. As the operating fluid is in constant motion when a ship is at sea there is normally little or no tendency for precipitation to occur in such a fluid.

An example of an operating fluid in which precipitation will not occur is a fluid consisting of fine particles of barium sulphate in a colloid formed of bentonite and water.

Other solids may be used e.g., lead sulphide ground to a powder or ground iron pyrites.

The use of an operating fluid as described having a relatively high specific gravity makes it possible to utilize apparatus having considerably smaller dimensions than apparatus intended for the use of fluids of specific gravity which are unity or only slightly exceed unity.

Operating fluid as described may be used with roll-reducing apparatus i.e., apparatus in which the fluid is free to flow from one tank to the other, the system being so designed that the natural rolling period of the ship and the natural oscillatory period of the fluid flow from one tank to the other remain in the region of 90° out of phase with one another, or with stabilizing apparatus in which operating fluid or part of the operating fluid is pumped from one tank to another to anticipate a roll.

What is claimed is:
1. Roll-reducing or stabilizing apparatus for a ship, of the type in which at least two tanks located at different parts of the ship and connected by a flume contain an operating fluid, in which the operating fluid consists of a suspension of a heavy solid in a liquid.

2. Roll-reducing or stabilizing apparatus as claimed in claim 1, in which the particles of the heavy solid are sufficiently small to permit the solid and the liquid to form a colloid.

3. Roll-reducing or stabilizing apparatus as claimed in claim 1, in which the particles of the heavy solid are larger than the maximum size necessary to form a colloid and the fluid contains an auxiliary solid which readily forms a colloid with the liquid, the colloid formed by the particles of the auxiliary solid and the liquid preventing the particles of the heavy solid from precipitating.

4. Roll-reducing or stabilizing apparatus as claimed in claim 2, in which the operating fluid contains a quantity of a buffer solution to prevent the colloid from being easily broken.

5. Roll-reducing or stabilizing apparatus as claimed in claim 3, in which the operating fluid contains a quantity of a buffer solution to prevent the colloid from being easily broken.

6. Roll-reducing or stabilizing apparatus as claimed in claim 1, in which the fluid contains a viscosity-reducing substance.

7. Roll-reducing or stabilizing apparatus as claimed in claim 1, in which the operating fluid consists of a suspension of barium sulphate in water.

8. Roll-reducing or stabilizing apparatus as claimed in claim 3, in which the operating fluid consists of particles of barium sulphate in a colloid formed of bentonite and water.

9. Roll-reducing or stabilizing apparatus as claimed in claim 1, in which the operating fluid consists of a suspension of lead sulphide particles in a liquid.

10. Roll-reducing or stabilizing apparatus as claimed in claim 1, in which the operating fluid consists of a suspension of particles of iron pyrites in a liquid.

No references cited.

MILTON BUCHLER, *Primary Examiner.*

T. M. BLIX, *Assistant Examiner.*